Jan. 17, 1956

H. C. WALLACE ET AL 2,731,246

SEED CLEANER, GRADER AND TREATER

Filed May 18, 1953

INVENTORS
Halbert C Wallace and
BY Charles H. Puckering
*Fishburn & Mullendore*
ATTORNEYS.

Jan. 17, 1956  H. C. WALLACE ET AL  2,731,246
SEED CLEANER, GRADER AND TREATER
Filed May 18, 1953  2 Sheets-Sheet 2
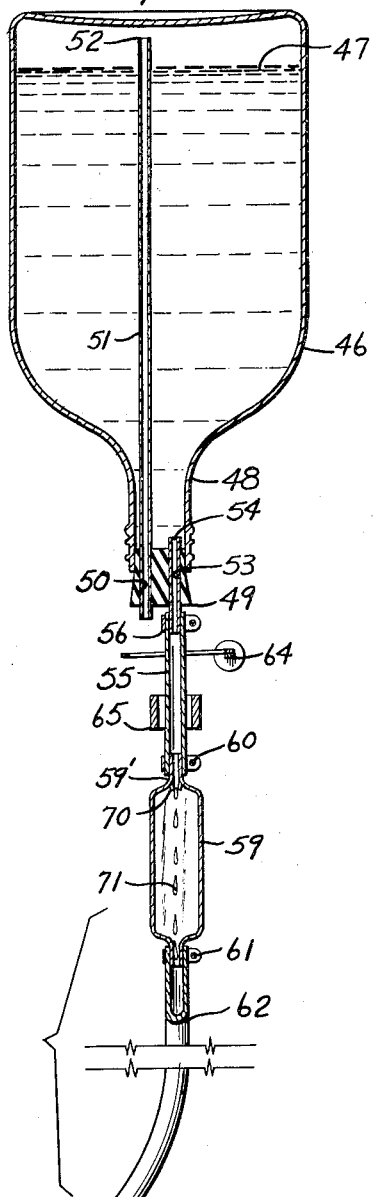
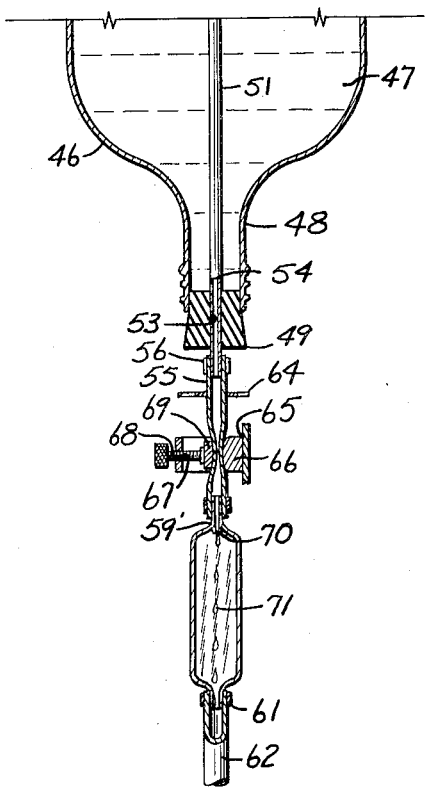
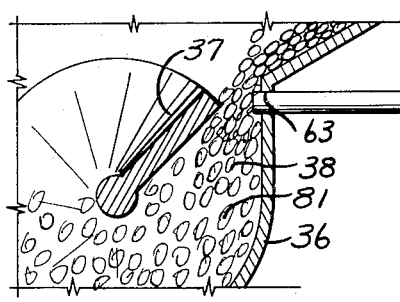
INVENTORS
Halbert C. Wallace and
BY Charles H. Puckering.
ATTORNEYS

United States Patent Office 2,731,246
Patented Jan. 17, 1956

2,731,246

SEED CLEANER, GRADER AND TREATER

Halbert C. Wallace and Charles H. Puckering, Fargo, N. Dak., assignors to Link Manufacturing Company, Inc., Fargo, N. Dak., a corporation of North Dakota Application May 18, 1953, Serial No. 355,494

3 Claims. (Cl. 259—4)

This invention relates to a grain and seed cleaner, grader and treater, and more particularly to apparatus for applying a disinfectant to seed for the prevention of disease to improve the virility and germination of the seed.

The principal object of the present invention is to provide for feeding of the seed or grain in a regulated flow to a mixing chamber and there applying a predetermined amount of liquid disinfectant to the seed while it is being mixed or stirred to produce a uniformly treated and mixed grain for seeding purposes.

It is well known that smut, rust and other harmful elements have been a great detriment to growers of grain, and various methods and apparatus have been devised to prevent such diseases. Seed, air and soil-borne diseases are increasingly evident in feed and cereal crops and pathologists recommend some form of treatment and disinfection to prevent such diseases. Heretofore disinfecting materials have been used in the form of dust or powder which is dangerous to persons handling the disinfectant because most such disinfectants are toxic to humans, requiring in some instances masks to be worn by the user to protect him from the harmful disinfectant. The dust will adhere to bags, equipment and clothing and causes discomfort to the user and sometimes results in illness.

Other objects of the present invention are to overcome these hazards and to provide a liquid disinfectant to the grain as it is being mixed whereby the liquid in gasifying distributes the toxic chemicals by diffusion throughout the grain mass and no harmful fumes or dust will result. The grain mass will absorb the active particles in the gases and the distribution is general so that each kernel has a molecular layer of the treating chemical. The liquid carrier will evaporate quickly, leaving the grain dry, clean to handle, and the seed is disinfected so that the process will continue even in the soil after planting.

Still further objects of the invention are to provide apparatus for force feeding of the grain or seed in a predetermined continuous stream to the mixing chamber where the liquid disinfectant is applied, to provide apparatus for separating the chaff, weed seed and other inert material from the grain as it is being cleaned so that only the cleaned graded seed need be treated with the disinfectant; to provide for regulating the flow of grain to the feeding mechanism and to the treating and mixing chamber; to provide apparatus for supplying the liquid disinfectant to the mixing chamber; to provide means for supplying the liquid disinfectant in regulated quantities in proportion to the amount desired for treating a predetermined amount of seed; to provide apparatus for supplying a liquid disinfectant in concentrated form to the mixing chamber for treatment of the grain and seed to avoid handling of large quantities of diluted disinfectant; and to provide apparatus of this character of simple construction and easily operated.

In accomplishing these and other objects of the invention, we have provided improved structure, the preferred form of which is illustrated in the accompanying drawings wherein:

Fig. 3 is an elevational cross-sectional view of the liquid disinfectant container and its parts for supplying the disinfectant to the mixing chamber of the device.

Fig. 4 is a cross-sectional view through a part of the liquid treating mechanism, particularly illustrating the regulation of the disinfectant through the tube.

Figure 1:
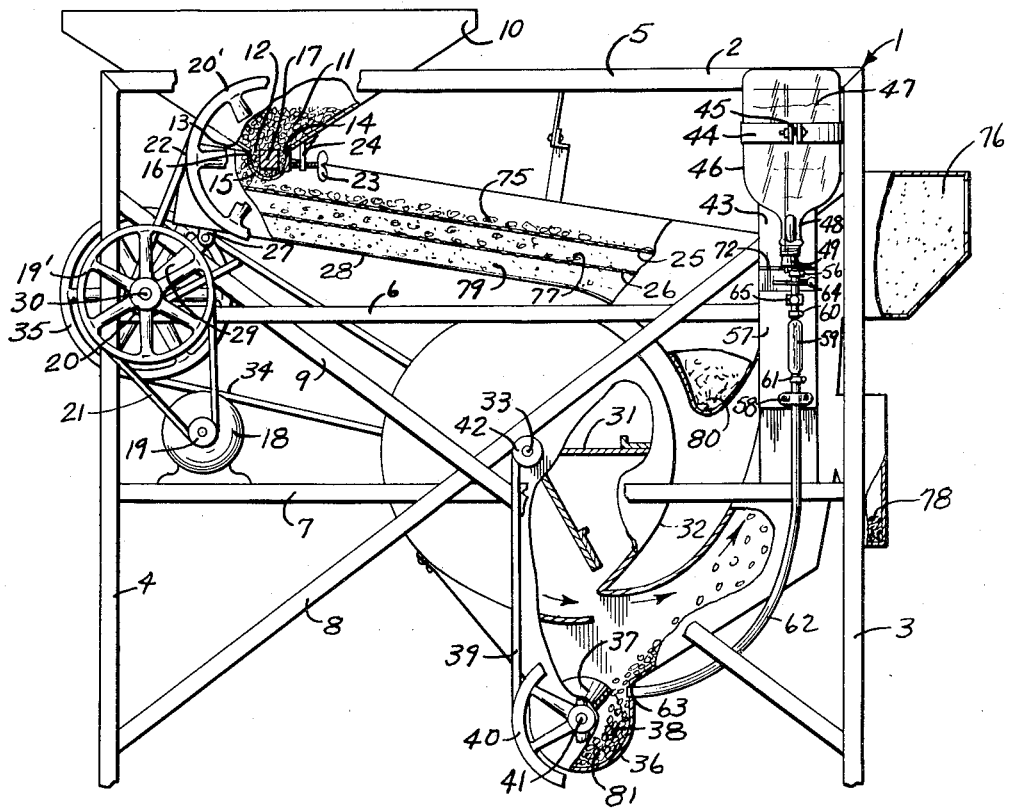
Fig. 1 is a side view of a grain and seed cleaner, grader and treater embodying the features of our invention with parts broken away to better illustrate the working parts.
Figure 2:
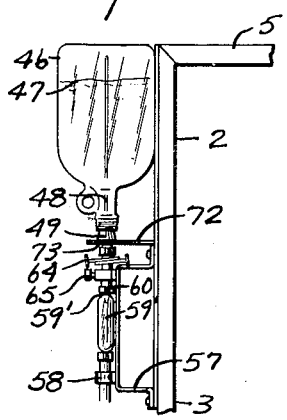
Fig. 2 is a side view showing attachment of the liquid disinfectant container to the framework of the machine.

Referring more in detail to the drawings:

1 designates a seed cleaner, grader and treater embodying the features of our invention, comprising a frame 2 having legs 3 and 4, top rails 5 and intermediate rails 6 and 7, and braces 8 and 9. Mounted on the frame is a hopper 10 for containing seed or grain as indicated at 11. The hopper has an open bottom 12 and side edges 13 and 14. Hingedly connected to the side edge 14 is a housing 15 circular in cross section and having its free edge adapted to be spaced from the edge 13 of the open bottom 12 of the hopper to form a passageway 16 for the seed to pass from the hopper.

The seed is forced from the hopper by a bar 17 located at substantially the bottom of the hopper within the housing 14 and is rotated through operation of a motor 18 mounted on the frame through pulleys 19 and 19' and pulleys 20 and 20' which act through belts 21 and 22 respectively. The size of the passageway 16 for the grain from the hopper is regulated by a hand screw 23 threadedly engaged in a bracket 24 mounted on hopper 10 as best illustrated in Fig. 1 so that the size of the passageway 16 may be regulated as desired.

Also mounted on the frame 2 are a plurality of screens 25 and 26. The screens are vibrated by an arm 27 which is attached to screen frame 28 and is pivotally attached to an arm 29 which in turn is connected to an eccentric (not shown) which is mounted on the shaft 30 upon which the pulley 19 is mounted.

A blower or fan having blades 31 is mounted in a housing 32 on a shaft 33 mounted upon the frame 2 as best illustrated in Fig. 1. The fan is also operated through the motor 18 by belt 34 running over pulley 35 mounted on shaft 30 and a pulley (not shown) on the shaft 33.

The housing 32 has an opening in the bottom to which is rigidly secured a cylindrical-shaped housing 36 in which is mounted an auger 37 providing a mixing chamber 38 for the cleaned and graded seed. The auger 37 is operated by a belt 39 running over pulley 40 on the auger shaft 41 and over pulley 42 on shaft 33 so that when the motor operates the fan it also rotates the auger conveyer to mix and convey the grain from the machine.

Mounted on the outside of the frame 2 on a plate 43 is an adjustable band 44 fastened as indicated at 45 for a container 46 of a disinfectant 47. The container 46 has a neck 48 adapted to receive a stopper 49 made of rubber or other similar material. The stopper has an opening 50 longitudinally thereof adapted to receive a tube 51 extending to near the other end of the container as indicated at 52 (Fig. 3) to provide an air vent to displace the liquid from the closed container. The stopper 49 also has an opening 53 adapted to receive a tube 54 to which is attached a piece of tubing 55 made of rubber, plastic or similar material, and held in place by a coupling clamp 56.

Secured to the plate 43 is a bracket 57 to which is secured by a suitable fastener 58 a glass tube 59 of larger diameter than the tube 55 for viewing the liquid disinfectant passing from the container passing to the mixing chamber as will later be described.

The tube 59 has necks 59' on each end and the tube 55 is fastened to the neck of the glass tubing by a clamp fastener 60 at its upper end. Secured to the neck on the lower end of the tubing 59 by a clamp fastener 61 is a tubing 62 also made of rubber, plastic or similar material, and which extends to and into an opening 63 in the mixing chamber 38 as best illustrated in Figs. 1 and 3.

A clip type shutoff 64 is provided for the rubber tubing 55 below the neck of the container to stop flow of the disinfectant from the container. Also mounted on this tubing 55 is a drop control member 65 which engages the rubber tubing with the rubber tubing passing therethrough. The control member has a stationary portion 66 which engages one side of the tubing and the opposite end is supplied with a threaded opening 67 through which a threaded shank 68 of a movable member is adapted to engage and having an end 69 engaging the opposite wall of the tubing. By adjustment of the movable wall, the inside opening of the rubber tubing can be reduced for any desired rate of flow and then maintained. The inner wall of the neck of the glass tubing is provided with a reduced or tapered member 70 extending into the glass so that the disinfectant will fall through the center of the glass tube in the form of drops 71 and be viewed by the user.

A plate 72 is also secured to the plate 43 of the frame and is provided with a recess 73 to pass around the tubings 51 and 54 to allow the stopper of the container to rest thereon to aid in supporting the container.

Operation of apparatus constructed and assembled as described is as follows:

The container 46 may be filled with the disinfectant and the stopper with the glass tubes inserted in the neck so that the tube 51 extends to above the level of the liquid when the bottle is inverted and placed on the plate 72 and then the container may be held to the frame by the band 44 by tightening of the fastener 45. Care must be taken to not tighten the band to the extent that the glass container will be broken. The shutoff clip 64 prevents the disinfectant from passing through tube 55 while the device is not in operation. When ready to use, remove clip 64 from tube 55 as placed on glass tube 54 until ready to stop flow when it is again placed on tube 55. The drop regulator device 65 may be adjusted by manipulation of the movable member 69 by screw 68. By predetermining the bushel per hour of seed being cleaned and graded in the apparatus the drop regulator may be adjusted for the required of drops per minute to be supplied to the grain. The rate of flow or number of drops per minute can be seen through the glass tube 59.

The cleaner and grader is then set in motion by operation of the motor 18 after having adjusted the screw control feed gauge 23 on the hopper, to control rate of flow of the grain with respect to the amount of drops of disinfectant passing from the container. The screens 25 and 26 will be vibrated so that the heavy graded grain 75 will pass the air from the blower and the chaff, dust and refuse will pass out through the chute 76 and the lighter grain as indicated at 77 will pass over the blower chute and be deposited in the chute 78 to be saved for feed or other purposes. The weed seed, broken kernels and dirt as indicated at 79 will pass through the screen 26 and to spout 80 and will be delivered to the side of the container to be disposed of as desired. The heavy and graded grain will be passed over the blower and be deposited in the mixing chamber 36 as indicated at 81 and the disinfectant flowing through the tube 62 will be mixed with the grain. The auger 37 will stir the grain causing the disinfectant to become gasified and diffused to coat all of the grain in the mixing chamber and the auger will carry the grain to the side of the machine to a storage bin or to an elevator for carrying to storage as desired.

Modern liquid disinfectants are available in concentration so that as little as one-half ounce or approximately 230 drops of fluid per bushel of seed will give satisfactory results. One gallon of disinfectant will treat approximately 256 bushels of seed. When the fluid has been used the empty container can be removed from the holder frame and the tube arrangement attached to the stopper reapplied to a fresh container of disinfectant and the whole inserted into the holder and the process resumed. The shutoff clip may be applied without any change in the flow rate of drops per minute and thus be the means of stopping or starting the flow of liquid without resetting the rate.

The invention may be utilized for merely treating the grain by controlling the flow of the grain and carrying the grain to the mixing chamber without screening or blowing.

We preferably clean the machine and particularly the mixing chamber with water or steam after treating grain so that any injurious substances may be washed and scrubbed out so that the machine can again be operated with clean grain and not come in contact with the treating liquid.

It will be obvious from the foregoing that we have provided an improved mechanism for regulating the feed grain or seed to a cleaning and grading operation and treatment of the grain with a liquid disinfectant by predetermined amounts of such liquid to a predetermined amount of grain in one operation or merely treating the grain without grading to accomplish the desired result.

What we claim and desire to secure by Letters Patent is:

1. Apparatus for treating grain of the character described comprising, a framework having a longitudinal hopper for the grain, said hopper having downwardly converging side walls and an open bottom, a longitudinal housing hingedly connected to the lower edge of one of said downwardlly converging side walls and having its free edge terminating adjacent the free edge of the other downwardly converging side wall to form a passageway for said grain, a treating chamber, means on said hopper and cooperating with said housing for adjusting the size of said passageway, rotatable means in said housing, means for rotating said rotatable means, said rotatable means having angle portions thereon for catching said grain and delivering same through said passageway in regulated predetermined amounts and delivering same to said treating chamber in continuous flow, a container having a supply of liquid disinfectant therein, a tubing connecting the container to the treating chamber, means in said line for regulating flow of the liquid to said chamber, and means for agitating said grain in the treating chamber to mix the grain with said disinfectant and delivering said grain to storage.

2. Apparatus for cleaning, grading and treating grain comprising a framework having a longitudinal hopper for the grain, said hopper having downwardly converging side walls and an open bottom, a longitudinal housing hingedly connected to the lower edge of one of said downwardly converging side walls and having its free edge terminating adjacent the free edge of the other downwardly converging side wall to form a passageway for said grain, a treating and mixing chamber, screening means carried by said framework, means on said hopper and cooperating with said housing for adjusting the size of said passageway, rotatable means in said housing, means for rotating said rotatable means, said rotatable means having angle portions thereon for engaging said grain and delivering same through said passageway to said screening means in regulated predetermined amounts, a housing carried by the framework, a blower in said last named housing for cleaning said grain, a motor for operating said blower and for vibrating said screens, means for carrying the light grain and foreign material past the blower and to a place of storage, means for delivering the graded grain to the mixing chamber in continuous flow, a container having a supply of liquid disinfectant therein, a tubing connecting the container to the mixing chamber, means in said line for regulating flow of the liquid to said chamber, and means for agitating said grain in the mixing chamber to mix the grain with said disinfectant and delivering said grain to storage.

3. Apparatus for treating grain of the character described comprising, a framework having a longitudinal hopper for the grain, said hopper having downwardly converging side walls and an open bottom, a longitudinal housing hingedly connected to the lower edge of one of said downwardly converging side walls and having its free edge terminating adjacent the free edge of the other downwardly converging side wall to form a passageway for said grain, a housing and screens carried by the framework structure, a treating and mixing chamber, means on said hopper and cooperating with said first mentioned housing for adjusting the size of said passageway, rotatable means in said first named housing, means for rotating said rotatable means, said rotatable means engaging said grain and delivering same through said passageway to said last named housing carried by the frame, a blower in said last named housing for cleaning said grain, a motor for operating said blower and for vibrating said screens, means for carrying the light grain and foreign material past the blower and to a place of storage, means for delivering the graded grain to the mixing chamber in continuous flow, a container having a supply of liquid disinfectant therein, a duct connecting the container to the mixing chamber, means in said duct for regulating flow of the liquid to said chamber, and means for agitating said grain in the mixing chamber to mix, the grain with said disinfectant and delivering said grain to storage.

References Cited in the file of this patent

UNITED STATES PATENTS

| | | |
|---|---|---|
| 377,923 | Arnett | Feb. 14, 1888 |
| 512,702 | Henry | Jan. 16, 1894 |
| 752,646 | Boughton | Feb. 23, 1904 |
| 1,001,508 | Craig | Aug. 22, 1911 |
| 1,293,034 | Chambers | Feb. 4, 1919 |
| 1,760,906 | Johnson | June 3, 1930 |
| 2,174,322 | Hatfield | Sept. 26, 1939 |